(12) United States Patent
Torres et al.

(10) Patent No.: US 8,214,345 B2
(45) Date of Patent: Jul. 3, 2012

(54) CUSTOM CONSTRAINTS FOR FACETED EXPLORATION

(75) Inventors: Robert J. Torres, Colleyville, TX (US); Douglas S. Brown, Charlotte, NC (US); Alexander W. Holt, New Platz, NY (US); Michael E. Moran, Ridgewood, NJ (US); James R. Rudd, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 11/539,086

(22) Filed: Oct. 5, 2006

(65) Prior Publication Data

US 2008/0086451 A1 Apr. 10, 2008

(51) Int. Cl.
*G06F 17/30* (2006.01)

(52) U.S. Cl. ........ 707/706; 707/707; 707/726; 707/729; 707/805; 715/700

(58) Field of Classification Search .................. 707/805, 707/707, 706, 726, 729; 715/707
See application file for complete search history.

(56) References Cited

U.S. PATENT DOCUMENTS

| | | | |
|---|---|---|---|
| 5,680,619 A | 10/1997 | Gudmundson et al. | |
| 5,966,126 A | 10/1999 | Szabo et al. | |
| 6,012,051 A * | 1/2000 | Sammon et al. | 706/52 |
| 6,711,577 B1 * | 3/2004 | Wong et al. | 707/694 |
| 6,826,553 B1 | 11/2004 | DaCosta et al. | |
| 6,847,964 B2 * | 1/2005 | Hayduk, Jr. | 707/767 |
| 6,952,693 B2 * | 10/2005 | Wolff et al. | 1/1 |
| 7,035,864 B1 | 4/2006 | Ferrari et al. | |
| 7,062,483 B2 * | 6/2006 | Ferrari et al. | 1/1 |
| 2001/0037359 A1 * | 11/2001 | Mockett et al. | 709/203 |
| 2002/0029259 A1 | 3/2002 | Okada | |
| 2002/0042750 A1 * | 4/2002 | Morrison | 705/26 |
| 2003/0009467 A1 * | 1/2003 | Perrizo | 707/100 |
| 2003/0067489 A1 | 4/2003 | Wong et al. | |
| 2004/0122674 A1 | 6/2004 | Bangalore et al. | |
| 2005/0044043 A1 * | 2/2005 | Gooding et al. | 705/42 |
| 2005/0192953 A1 * | 9/2005 | Neale et al. | 707/4 |
| 2005/0203918 A1 * | 9/2005 | Holbrook | 707/10 |
| 2005/0261989 A1 * | 11/2005 | Vadon et al. | 705/27 |
| 2006/0053104 A1 * | 3/2006 | Ferrari et al. | 707/3 |

(Continued)

OTHER PUBLICATIONS

USPTO ExParteQuayle action for U.S. Appl. No. 11/567,246 dated Mar. 9, 2010.

*Primary Examiner* — Angela M Lie
*Assistant Examiner* — Fatima Mina
(74) *Attorney, Agent, or Firm* — Yee & Associates, P.C.; Mark C. Vallone (57) ABSTRACT

The Facet Navigator permits users to set custom constraints for searching databases by facet, displays facets representing fields in a database, and provides a manipulator for each facet. The manipulator may be a slider bar, or a drop-down menu, or some other interactive device known to persons skilled in the art. When a user sets constraints for a facet with the manipulator, the Facet Navigator searches the database based on the constraints and displays a list of items in the database that satisfy the constraints. The Facet Navigator displays a preview of interim results whenever a cursor is moved over an active region of the manipulator, where the preview includes details of database items meeting a search criteria based on the location of the cursor on the manipulator.

10 Claims, 9 Drawing Sheets

U.S. PATENT DOCUMENTS

| | | |
|---|---|---|
| 2006/0150118 A1 | 7/2006 | Chaudhri et al. |
| 2006/0168536 A1 | 7/2006 | Portmann |
| 2006/0294071 A1 | 12/2006 | Weare et al. |
| 2007/0219960 A1* | 9/2007 | Vadon et al. ............ 707/3 |
| 2008/0005118 A1* | 1/2008 | Shakib et al. ........... 707/10 |
| 2008/0034329 A1* | 2/2008 | Posner et al. ........... 715/856 |

* cited by examiner

CUSTOM CONSTRAINTS FOR FACETED EXPLORATION

FIELD OF THE INVENTION

The current invention relates generally to database access, and relates specifically to an operator interface for setting database search constraints.

BACKGROUND OF THE INVENTION

Faceted exploration is a known method of searching databases where each facet represents a field in a database. E-commerce web sites often employ faceted exploration on the Internet. For example, an online retailer may have two thousand models of digital cameras for sale, but a potential purchaser may only be interested in specific facets such as price, resolution, brand, zoom capability, and memory type. Additional facets may include descriptions of product quality, product value comparisons, and customer ratings. With faceted exploration, a potential customer can search the list of products by facet or by adding constraints to existing facets. Thus, the customer can narrow a list of two thousand products down to a few products with just a few mouse clicks. Sometimes, a hyperlink for each searched product list shows a preview of the research results, called interim results, such as an indication of the number of items meeting the search criteria associated with the product list. Interim results enable customers to narrow product lists with greater precision.

Figure 1:
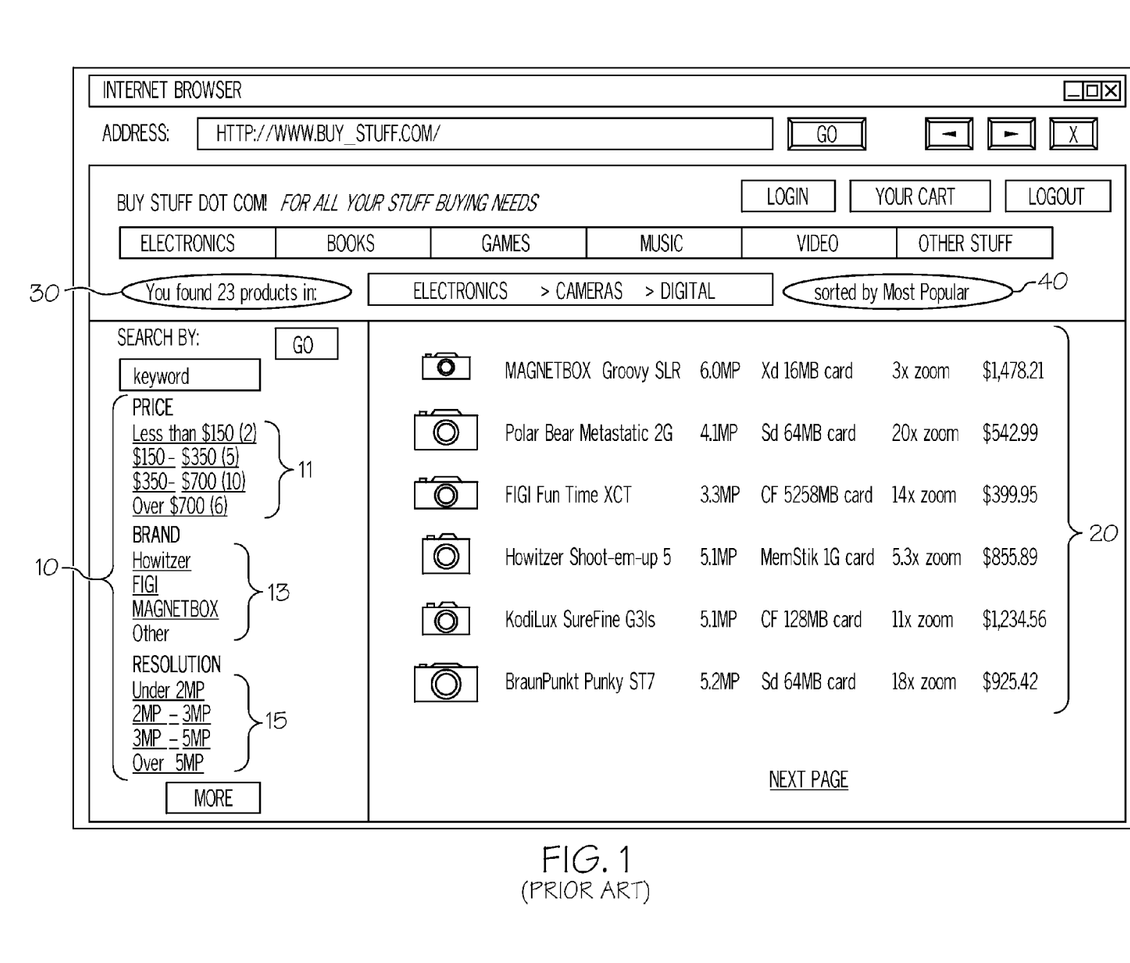
FIG. 1. is an exemplary prior art faceted exploration window.

FIG. 1 shows an exemplary prior art faceted exploration window for a fictitious online retailer of digital cameras. Price, Brand, and Resolution area 10 represents facets that can be used to search the list of available digital cameras according to price, brand, or resolution. Price field 11 represents predefined price constraints that a customer can use for searching the list of available digital cameras by price. Brand field 13 represents predefined brand constraints a customer can use for searching the list of available digital cameras by manufacturer. Resolution field 15 represents predefined resolution constraints a customer can use for searching the list of available digital cameras by picture resolution. Found field 30 indicates the total number of digital cameras in the list. Sorted by field 40 indicates how the list is currently sorted and displayed. Product display field 20 shows the currently searched and sorted list of digital cameras.

There are, however, shortcomings to the current methods of faceted exploration. When a search does not reveal what the customer desires, the customer often back-tracks to try alternate searches. Iterative back-tracking and repeating prior searches is called "pogo-sticking." There are several factors that contribute to pogo-sticking during faceted exploration.

In the current art, many faceted searches do not provide interim results. Customers must view the final results to see if they are on the right track. If the results do not reveal the desired products, the customer must try a different search. When faceted search options do provide interim results, the results are generally one-dimensional, showing just a count for the facet or facet constraint. For example, Price field 11 of FIG. 1 shows interim results, indicating the number of cameras in each price range. The number of cameras in the price range is displayed in parentheses following the price range. While displaying the number of products available in a certain facet range is useful, the prior art interim result does not tell the customer anything else about the products in that facet. Without detailed interim results, customers must engage in pogo-sticking to obtain detailed information.

Also contributing to pogo-sticking are the limited number of constraints provided for a facet. Other than basic keyword searches, customers are limited to pre-defined constraints. In the prior art, customers can look at cameras within certain price ranges, but the customer can't combine ranges or set a custom range. For example, price field 11 of FIG. 1 shows four possible price ranges: less than $150, $150-$350, $350-$700, and over $700. If a customer wants to search for cameras between the price of $200-$500, the customer must first search the $150-$350 range, and then repeat the search in the $350-$700 range. Both searches will include cameras that the customer is not interested in, and no single search will include all the cameras the customer is interested in. Likewise, when searching by brand or resolution, only one predefined constraint category can be selected at a time, even if the customer wants to compare multiple brands and a range of resolutions. Ultimately, the customer must resort to pogo-sticking or rigorous manual searching to see all the cameras in an acceptable price range from selected manufacturers with the desired resolution.

Studies show that customers are less likely to purchase products from a site where they must pogo-stick to find a desired product than from a site where they find the desired product on the first search iteration. Thus, a need exists to provide customers with the ability to define custom constraints for an efficient faceted exploration that can eliminate or reduce the need for pogo-sticking.

SUMMARY OF THE INVENTION

A Facet Navigator provides a manipulator for each facet in a database that enables users to set custom constraints for searching the database by facet. When a user sets constraints for a facet with the manipulator, the Facet Navigator searches the database based on the constraints set by the user with the manipulator and displays a searched list if items from the database satisfy the constraints. In addition the Facet Navigator displays interim results whenever the user moves a cursor over an active region of the manipulator. The preview includes details of database items satisfying a search criteria based on the location of the cursor over the manipulator.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Facet Navigator."

Figure 2:
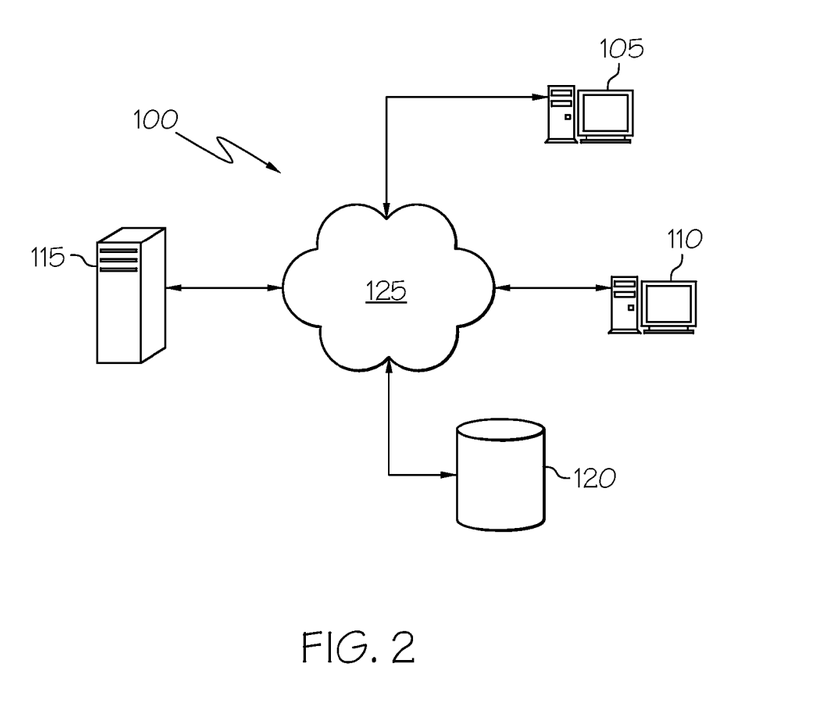
FIG. 2. is an exemplary computer network.

Additionally, the Facet Navigator is described below with reference to an exemplary network of hardware devices, as depicted in FIG. 2. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 3:
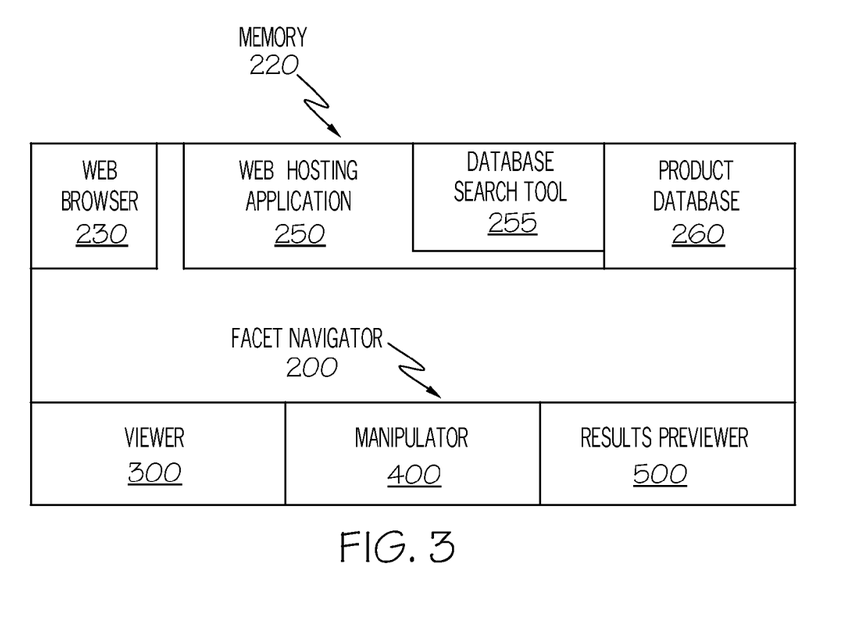
FIG. 3. describes programs and files in a memory on a computer.

Facet Navigator 200 typically is stored in a memory, represented schematically as memory 220 in FIG. 3. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, Facet Navigator 200 may reside in more than one memory distributed across different computers, servers, logical partitions or other hardware devices. The elements depicted in memory 220 may be located in or distributed across separate memories in any combination, and Facet Navigator 200 may be adapted to identify, locate and access any of the elements and coordinate actions, if any, by the distributed elements. Thus, FIG. 3. is included merely as a descriptive expedient and does not necessarily reflect any particular physical embodiment of memory 220. As depicted in FIG. 3, though, memory 220 may include additional data and programs. Of particular import to Facet Navigator 200, memory 220 may include web browser 230, web hosting application 250 and product database 260, with which Facet Navigator 200 interacts. Web hosting application 250 has a sub-component, database search tool 255. Web browser 230, web hosting application 250, including database search tool 255 and product database 260 all exist in the art, and are commonly used by Internet based retailers. Facet Navigator 200 integrates directly with web hosting application 250 and has viewer 300, manipulator 400 and results previewer 500. Viewer 300 is a prior art viewer that displays a searched list of items from product database 260. Manipulator 400 adds a constraint setting capability to the prior art faceted search to allow users to set custom constraints for each facet. Results previewer 500 displays enhanced interim results when a cursor hovers over an active area of the manipulator controls.

Figure 4:
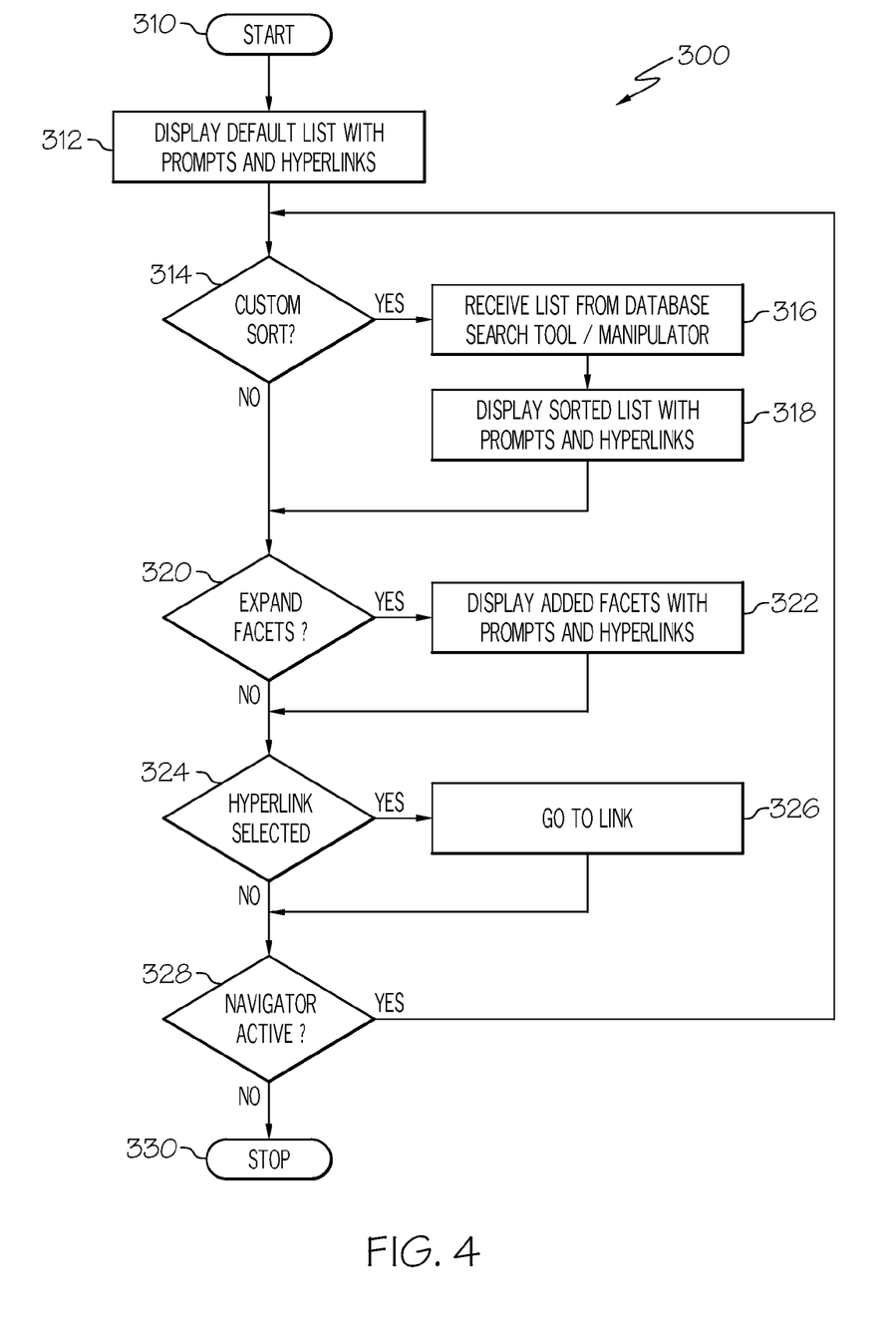
FIG. 4. is a flowchart of a Facet Navigator viewer.

A flowchart of viewer 300 is shown in FIG. 4. Viewer 300 starts whenever web host application 250 publishes a Facet Navigator 200 enabled web page viewable by a user of web browser 230 (310). Viewer 300 displays the default search results of items in product database 260 (312). The search results may be a text list, a captioned graphic, or some combination of graphics and text, showing facets related to each item, such as actual price, manufacturer, model name, and so forth. The search results may include prompts, such as "add to shopping cart," and hyperlinks to a detailed description of the item. The default search results list is predefined by web hosting application 250, and the list may be displayed by a category such as special promotional items, most popular items, or a complete ordered list of all items. If the list is longer than what can fit on the visual display, the viewer may have a scroll bar or may propagate across multiple pages. If the user of web browser 230 initiates a custom search (314), viewer 300 receives a new ordered list from database search tool 255 or manipulator 400 (316) containing items from product database 260. Viewer 300 displays the searched list of items from product database 260 (318). A custom search is initiated by manipulating facet constraints (see FIG. 5) or by using other native search features in web hosting application 250, such as a keyword search. If the user of web browser 230 wants to expand the view to include more facets in the individual product descriptions (320), viewer 300 displays the additional facets in the existing searched list of items from product database 260, along with prompts and hyperlinks (322). If the user of web browser 230 clicks on a hyperlink (324), viewer 300 causes web browser 230 to go to the link (326). Going to a link will either spawn a new web page or a tab containing the linked page or will replace the existing web page with the linked page, essentially terminating Facet Navigator 200 and viewer 300. For as long as Facet Navigator 200 is active on an open web page (328), viewer 300 repeats steps 314-324. When Facet Navigator 200 stops because the user of web browser 230 moves on to another web page, or web browser 230 closes, viewer 300 stops (330).

Figure 5:
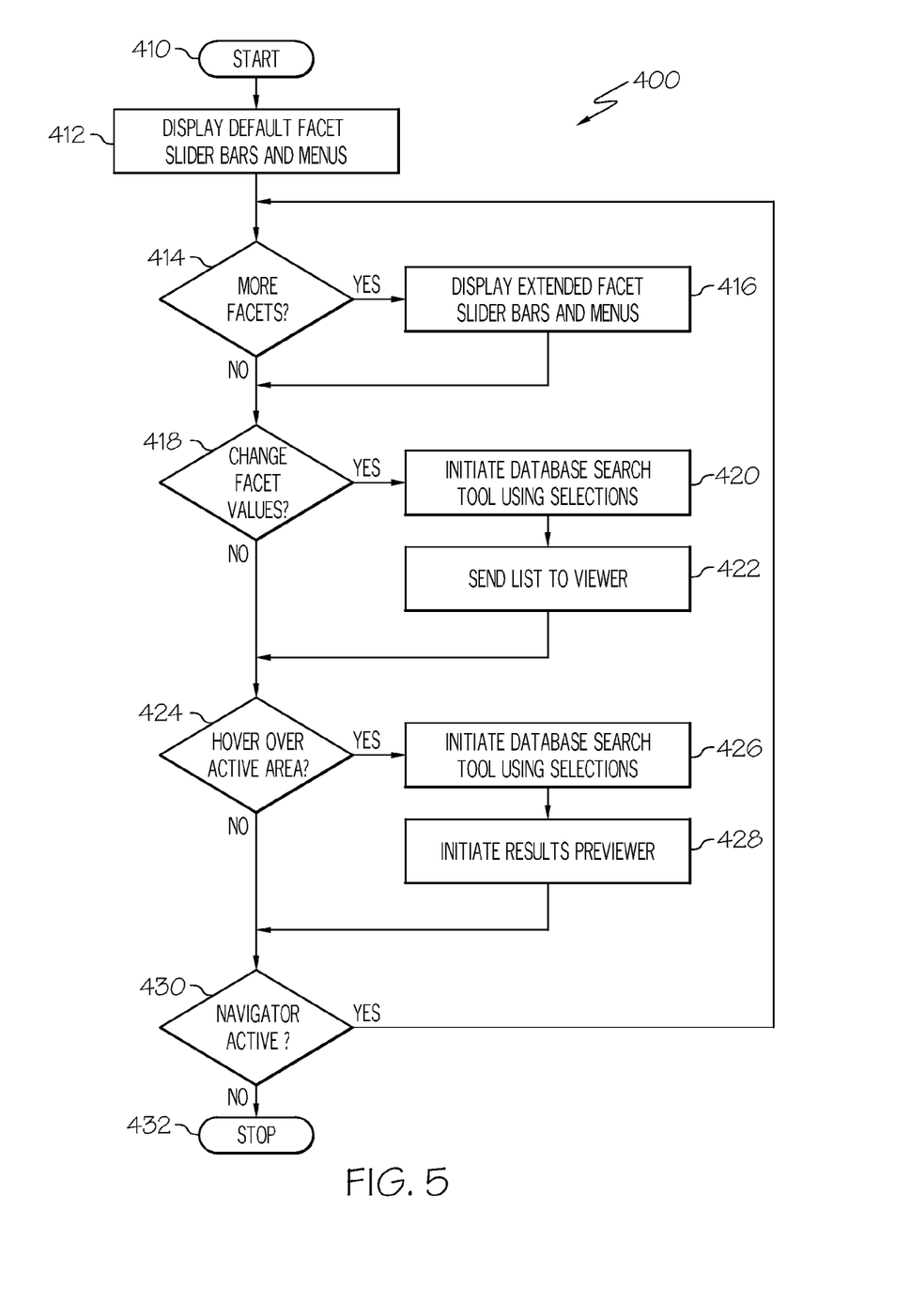
FIG. 5. is a flowchart of a Facet Navigator manipulator.

Manipulator 400, as shown in FIG. 5, starts whenever web host application 250 publishes a Facet Navigator 200 enabled web page viewable by a user of web browser 230 (410). Manipulator 400 displays a collection of default facets, and a manipulator for setting constraints for each facet (412). The default collection of facets is predefined by web hosting application 250, and likely includes only the most frequently searched facets for a particular group of products. Some facets are continuous, such as price, while other facets are made up of discrete elements, such as a manufacturer or a product feature. For continuous facets, the manipulator may be a slider bar, where a user can set a range by selecting a central point, or by selecting a minimum and maximum value. For discrete elements, the manipulator may comprise ticks on a bar, check-boxes, radio buttons or a drop-down menu. If the user of web browser 230 chooses to expand the display of available facets (414), manipulator 400 displays the expanded collection of facets with manipulators (416). The number and type of facets available depends on the product and the fields in product database 260. The expanded collection of facets is predefined by web hosting application 250. In one embodiment of Facet Navigator 200, users of web browser 230 may choose expanded facets merely by pressing a "more" or "expand" button. In another embodiment, users of web browser 230 may select desired facets from a menu. If the user of web browser 230 chooses change the constraint of a facet (418), Manipulator 400 initiates database search tool 255 using the selected constraints (420). In one embodiment of Facet Navigator 200, users of web browser 230 may choose to search by one or more constrained facets by pressing a "search" or "go" button. In another embodiment, manipulator 400 initiates the search automatically in response to a changed constraint setting. The searched list of items from product database 260 is sent to be displayed by viewer 300 (422). If the user of web browser 230 causes a mouse pointer to hover over the active area of a facet manipulator (424), manipulator 400 initiates database search tool 255 using the potentially selected constraints based on the location of the mouse cursor over the facet manipulator (426) and initiates results previewer 500 (428). For as long as Facet Navigator 200 is active on an open web page (430), manipulator 400 repeats steps 412-424. When Facet navigator stops because the user of web browser 230 has moved on to another web page, or web browser 230 closes, manipulator 400 stops (432).

Figure 6:
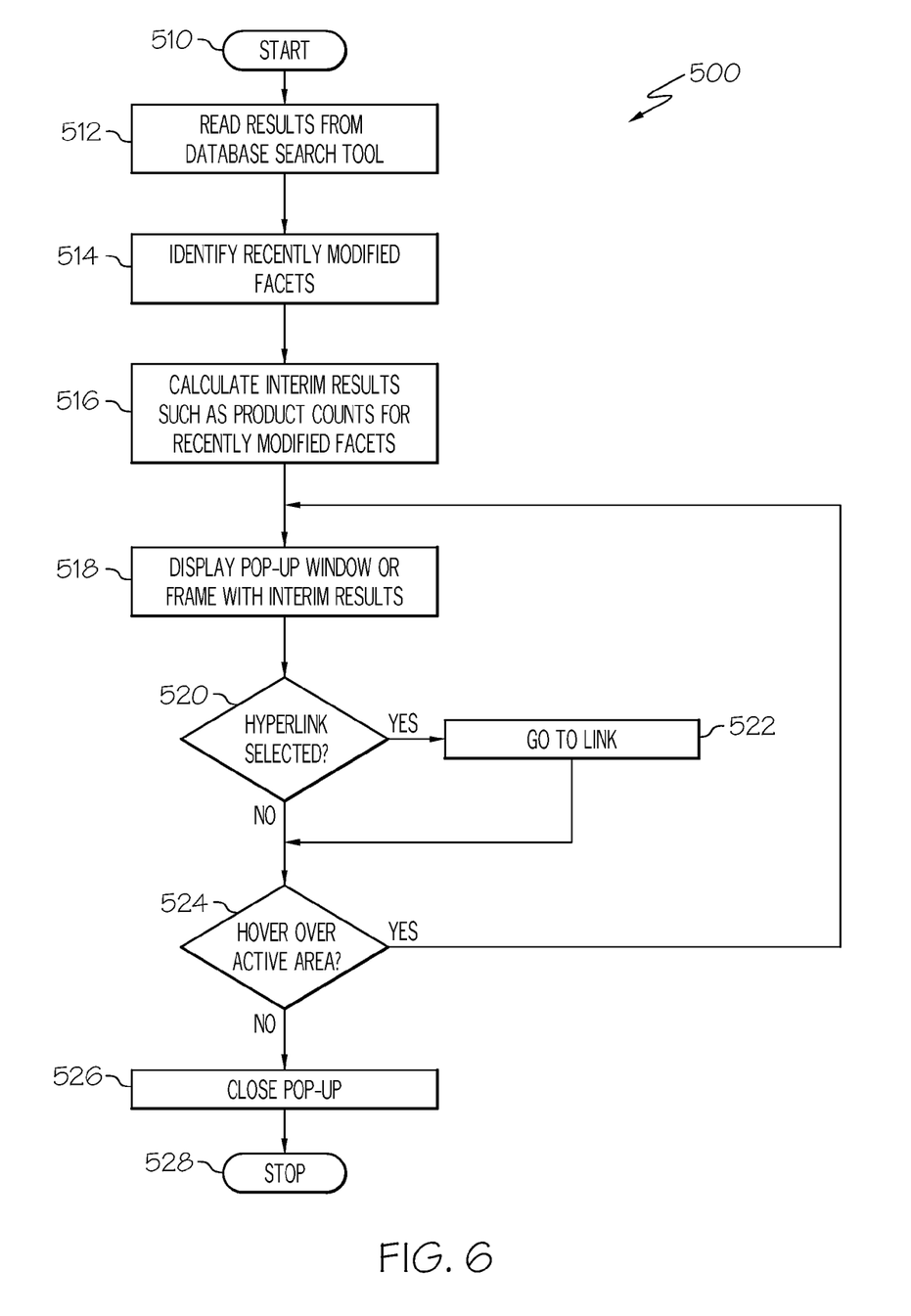
FIG. 6. is a flowchart of a Facet Navigator results previewer.

FIG. 6. depicts results previewer 600. Results previewer 600 starts when initiated by manipulator 500 (510), reads the results from database search tool 255 (512), and identifies any recently modified facets (514). Recently modified facets indicate facets potentially important to a user of web browser 230. Results previewer 600 calculates interim results (516). Interim results may include product counts for the recently modified facets or facet constraints, a portion of the searched items from product database 260 that meet the constraint of the previewed facet, or other details, such as brands, product features and hyperlinks to other search results or web pages. Results previewer 600 displays the interim results (518) in a pop-up window or frame. If the user of web browser 230 selects a hyperlink in the pop-up (520), Results previewer 600 causes web browser 230 to go to the link (522). Going to a link will either spawn a new web page or tab containing the linked page or will replace the existing web page with the linked page, essentially terminating Facet Navigator 200 and results previewer 500. For as long as the user of web browser 230 causes a mouse pointer to hover over the active area of a facet manipulator (524), results previewer 500 continues to display the pop-up, repeating steps 518-520. Whenever the mouse pointer stops hovering over the active area of a facet manipulator, results previewer 500 closes the pop-up (526) and stops (528). In another embodiment of Facet Navigator 200, hover based interim results are an option that users of web browser 230 may turn on and off.

Figure 7:
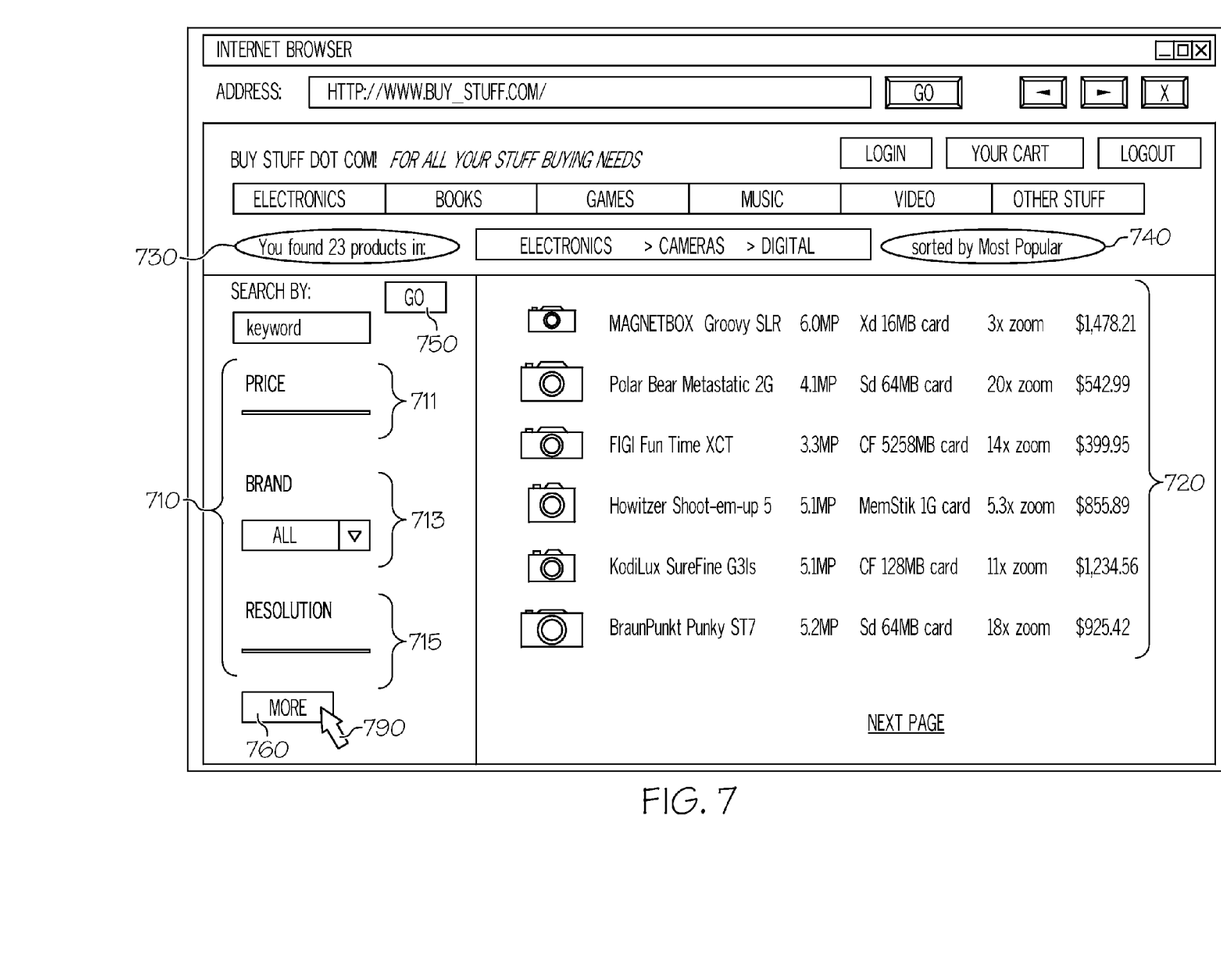
FIG. 7. is an exemplary window showing features of a Facet Navigator.

FIG. 7 depicts an exemplary faceted exploration window for a fictitious online retailer of digital cameras using the features of Facet Navigator 200. Combined facet field 710 represents the display of manipulator 400, with facets and manipulators that can be used to search the list of available digital cameras. Price manipulator 711 represents a slider bar of constraints a customer can use for searching the list of available digital cameras by price. Brand manipulator 713 represents drop-down menu with constraints a customer can use for searching the list of available digital cameras by brand. Resolution manipulator 715 represents a slider bar of constraints a customer can use for searching the list of available digital cameras by picture resolution. Found field 730 indicates the total number of digital cameras in the list. Sorted by field 740 indicates how the list of digital cameras is currently sorted and displayed. Product list field 720 shows the default list of digital cameras. Actuator 750 is a "go" button that initiates a custom search based on a keyword or constrained facet. Actuator 760 is a "more" button that will reveal expanded facets. Cursor 790 shows a mouse cursor selecting the "more" button.

Figure 8:
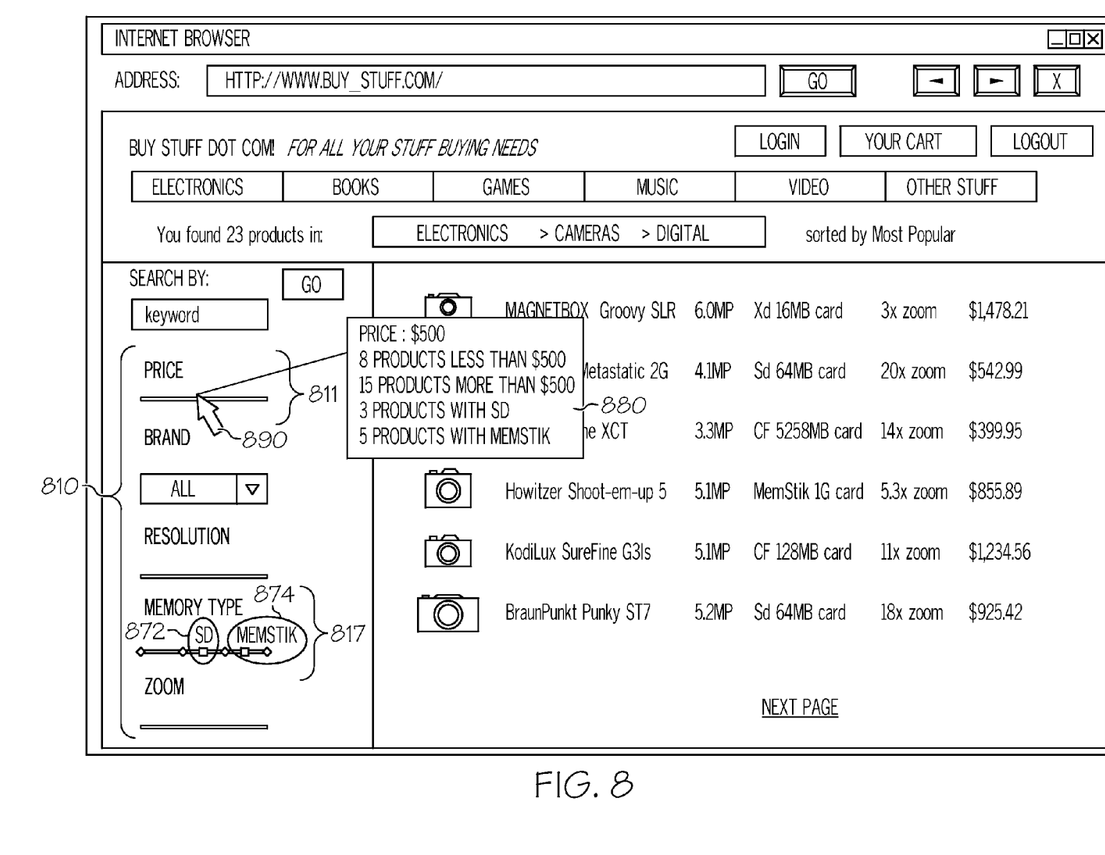
FIG. 8. is an exemplary window showing features of a Facet Navigator.

FIG. 8. shows the exemplary faceted exploration window of FIG. 7 using the features of Facet Navigator 200 with expanded facets. Expanded combined facet field 810 represents the display of manipulator 400, with an expanded collection of facets and manipulators that can be used to search the list of available digital cameras. Price bar 811 represents a slider bar of constraints that a customer can use for searching the list of available digital cameras by price. Cursor 890 represents a mouse cursor hovering over the price facet manipulator near $500 on the slider bar. Pop-up 880 represents results previewer 500 displaying interim results for digital cameras around the $500 price range. Memory bar 817 represents a slider bar with ticks for constraints that a customer can use for searching the list of available digital cameras by memory type. First constraint 872 represents a user selected constraint for the "Sd" memory type and second constraint 874 represents a user selected constraint for the "MemStik" memory type. With mouse cursor 890 hovering over price bar 811, results previewer 500 displays interim results in pop-up 880, showing the information related to the cursor's position on price bar 811 and the selected memory types from memory bar 817.

Figure 9:
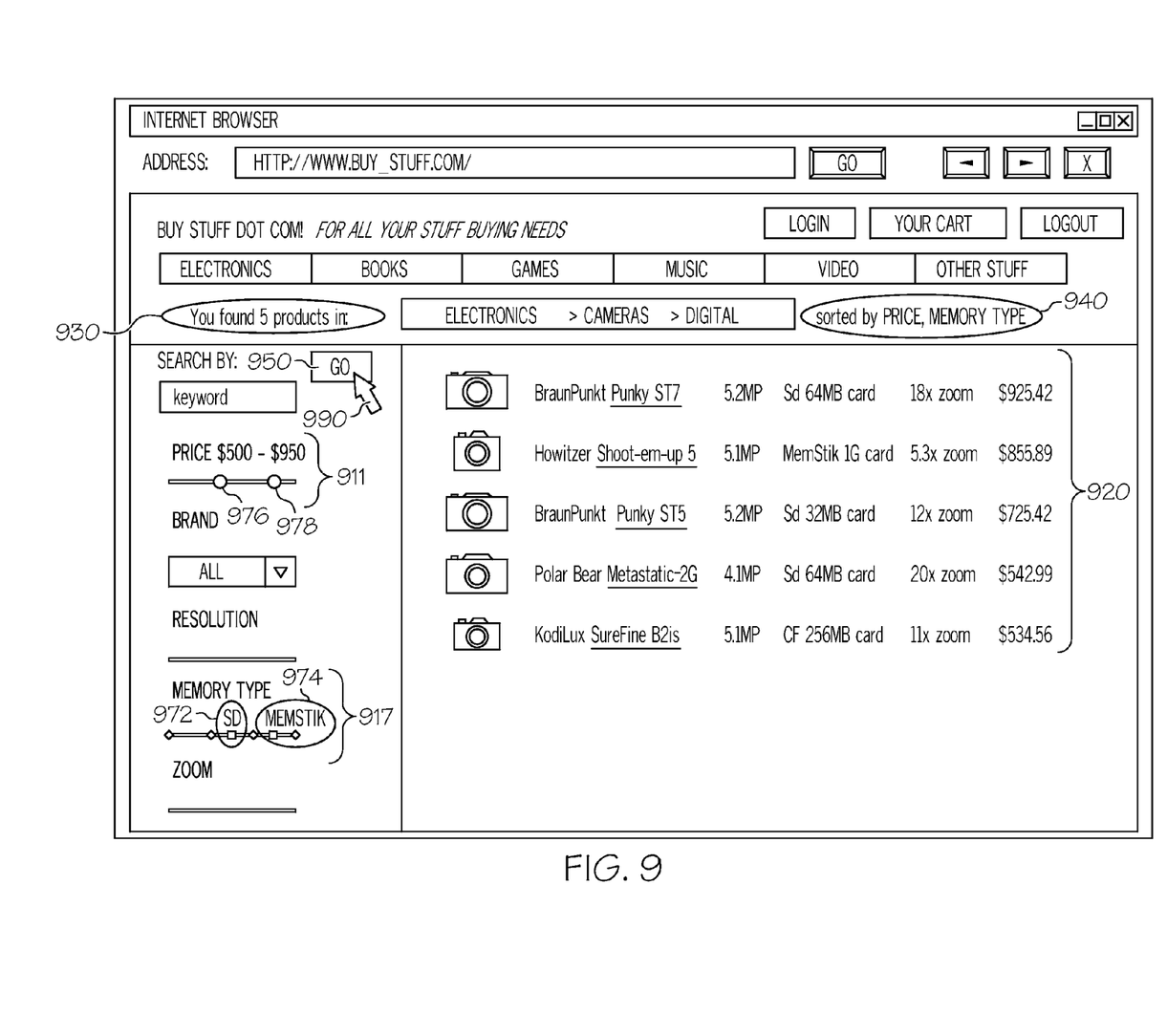
FIG. 9. is an exemplary window showing features of a Facet Navigator.

FIG. 9. shows the exemplary faceted exploration window of FIG. 8 using the features of Facet Navigator 200 after a search based on user-defined constraints. Price bar 911 represents a slider bar of constraints a customer can use for searching the list of available digital cameras by price. First constraint 976 represents a lower price constraint set by a customer at $500, and second constraint 978 represents an upper price constraint set by a customer at $950. Memory bar 917 represents a slider bar with ticks for constraints a customer can use for searching the list of available digital cameras by memory type. First constraint 972 represents a user selected constraint for the "Sd" memory type and second constraint 974 represents a user selected constraint for the "MemStik" memory type. Actuator 950 is a "go" button the initiates a custom search based on a keyword or constrained facet. Cursor 990 represents a mouse cursor that just finished selecting the "go" button. Product list field 920 shows the searched list of digital cameras based on the user defined constraints. Found field 930 indicates the total number of digital cameras in the list that meets all the user defined constraints. Sorted by field 940 indicates how the list of digital cameras is currently sorted and displayed.

Figure 10:
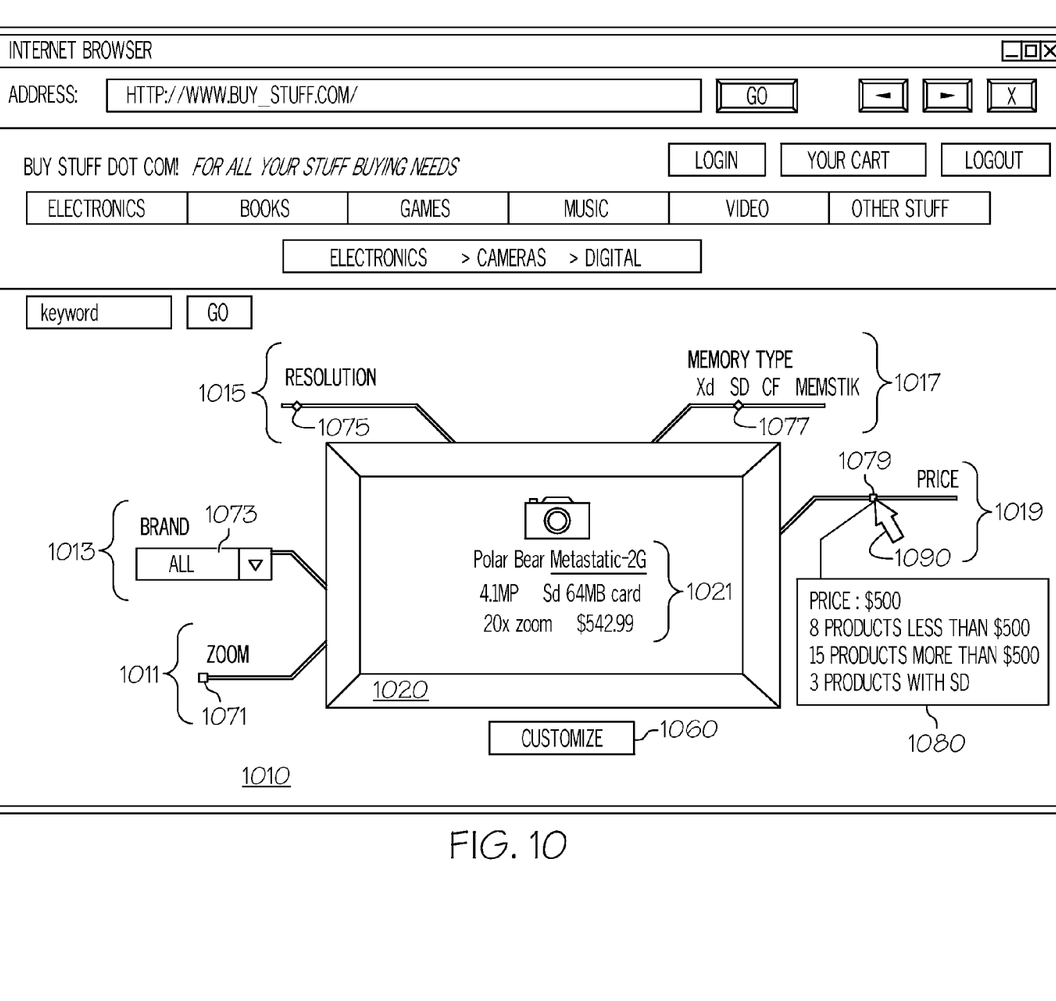
FIG. 10. is an alternate embodiment of a Facet Navigator.

FIG. 10 depicts an alternate embodiment of Facet Navigator 200. Manipulator field 1010 represents manipulator 400, and contains a collection of facets and constraint manipulators. View field 1020 represents viewer 300, displaying searched list 1021 of digital cameras that meet the user defined constraints. View field 1020 automatically updates in response to changes made to constraints in manipulator field 1010. "Customize" button 1060 permits users to select different facets to display in view field 1010. Zoom manipulator field 1011 employs a slider bar of constraints a customer can use for searching the list of available digital cameras by zoom capability. Slider 1071 is in a default position, indicating that the customer has not set a zoom constraint. Brand manipulator field 1013 employs a drop-down menu of constraints a customer can use for searching the list of available digital cameras by brand. Menu 1073 displays a default "all" selection, indicating that the customer has not set a brand constraint. Resolution manipulator field 1015 employs a slider bar of constraints that a customer can use for searching the list of available digital cameras by picture resolution capability. Slider 1075 is in a default position, indicating that the customer has not set a resolution constraint. Memory manipulator field 1017 employs a slider bar of constraints a customer can use for searching the list of available digital cameras by memory type. Slider 1077 is set to one of the available constraints, "Sd," indicating that the customer only wants to view cameras using the "Sd" memory type. Price manipulator field 1019 employs a slider bar of constraints a customer can use for searching the list of available digital cameras by price. Slider 1079 is set at $500, indicating that the customer wants to view cameras in a price range around $500. Pop-up 1080 represents results previewer 500 displaying interim results related to mouse cursor 1090 hovering over slider 1079 of price facet manipulator 1019.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method comprising:
a computer presenting in a display one or more facets, wherein the one or more facets comprise one or more fields in one or more databases, wherein the one or more facets further comprise one or more continuous facets and one or more discrete facets, and wherein one or more constraints are defined for each of the one or more facets;
the computer presenting, responsive to receiving a selection of a facet, a view field and one or more manipulator fields for the one or more facets, wherein the one or more manipulator fields are connected to and surround the view field on at least four sides of the view field, wherein each of the one or more manipulator fields comprises a graphical representation of one or more constraint values defined for the one or more facets;
the computer selecting the one or more constraint values for the one or more facets in the one or more manipulator fields;
the computer searching, by the one or more facets, the one or more databases;
the computer calculating, responsive to searching the one or more databases by the one or more facets, one or more interim search results for each selected constraint value, wherein the interim search results comprise at least one of product counts for recently modified facets or facet constraints, a portion of searched items that meet a constraint of a previewed facet, a brand, a product feature, and a hyperlink to another search result or web page;
the computer presenting, responsive to a cursor moving over an active region of the one or more manipulator fields for the one or more facets, a preview of the interim search results, wherein the preview includes one or more of: details of one or more database items satisfying one or more selected constraints for the one or more facets, or a numerical value indicating a number of items in the one or more facets satisfying the one or more selected constraints; and
the computer presenting in the view field a list of items retrieved from the one or more databases that meet one or more constraint values in the one or more manipulator fields, and wherein the view field automatically updates in response to a change in any of the one or more manipulator fields.

2. The method of claim 1 further comprising:
the computer displaying a graphical representation of the one or more constraints for the one or more continuous facets.

3. The method of claim 2 wherein the selecting the one or more constraint values for the one or more facets in the one or more manipulator fields comprises: selecting a point on a slider bar to set a range, wherein the range is defined by a minimum range and a maximum range.

4. The method of claim 1 further comprising the computer selecting, displaying, manipulating, or searching by an extended collection of the one or more facets related to the one or more fields in the one or more databases.

5. A computer program product comprising:
one or more computer-readable, tangible storage devices;
program instructions, stored on at least one of the one or more computer-readable, tangible storage devices, to display one or more facets, wherein the one or more facets comprise one or more fields in one or more databases, wherein the one or more facets further comprise one or more continuous facets and one or more discrete facets, and wherein one or more constraints are defined for each of the one or more facets;
program instructions, stored on at least one of the one or more computer-readable, tangible storage devices, to present, responsive to receiving a selection of a facet, a view field and one or more manipulator fields for the facet, wherein the one or more manipulator fields are connected to and surround the view field on at least four sides of the view field, and wherein each of the one or more manipulator fields comprises a graphical representation of one or more constraint values defined for the facet;
program instructions, stored on at least one of the one or more computer-readable, tangible storage devices, to select the one or more constraint values for the facet in the one or more manipulator fields;
program instructions, stored on at least one of the one or more computer-readable, tangible storage devices, to search, by the one or more facets, the one or more databases; and
program instructions, stored on at least one of the one or more computer-readable, tangible storage devices, to calculate, responsive to searching the one or more databases by the one or more facets, one or more interim search results for each selected constraint value, wherein the interim search results comprise at least one of product counts for recently modified facets or facet constraints, a portion of searched items that meet a constraint of a previewed facet, a brand, a product feature, and a hyperlink to another search result or web page;
program instructions, stored on at least one of the one or more computer-readable, tangible storage devices, to present, responsive to a cursor moving over an active region of the one or more manipulator fields for the facet, a preview of the interim search results, wherein the preview includes one or more of: details of one or more database items satisfying one or more selected constraint values for the facet, or a numerical value indicating a number of items in the facet satisfying the one or more selected constraint values; and
program instructions, stored on at least one of the one or more computer-readable, tangible storage devices, to present in the view field a list of items retrieved from the one or more databases that meet the one or more constraint values in the one or more manipulator fields, and wherein the view field automatically updates in response to a change in any of the one or more manipulator fields.

6. The computer program product of claim 5 further comprising:
  program instructions, stored on at least one of the one or more computer-readable, tangible storage devices, to display a graphical representation of the one or more constraints for the one or more continuous facets.

7. The computer program product of claim 6 wherein the program instructions to select the one or more constraint values for the facet in the one or more manipulator fields select a point on a slider bar to set a range, wherein the range is defined by a minimum range and a maximum range.

8. A system for searching one or more databases by one or more facets, the system comprising:
  one or more processors, one or more computer-readable memories and one or more computer-readable, tangible storage devices;
  program instructions, stored on at least one of the one or more computer-readable, tangible storage devices for execution by at least one of the one or more processors via at least one of the one or more computer-readable memories, to display one or more facets, wherein the one or more facets comprise one or more fields in one or more databases, wherein the one or more facets further comprise one or more continuous facets and one or more discrete facets, and wherein one or more constraints are defined for each of the one or more facets;
  program instructions, stored on at least one of the one or more computer-readable, tangible storage devices for execution by at least one of the one or more processors via at least one of the one or more memories, to present, responsive to receiving a selection of a facet, a view field and one or more manipulator fields for the facet, wherein the one or more manipulator fields are connected to and surround the view field on at least four sides of the view field, wherein each of the one or more manipulator fields comprises a graphical representation of one or more constraint values defined for the facet;
  program instructions, stored on at least one of the one or more computer-readable, tangible storage devices for execution by at least one of the one or more processors via at least one of the one or more memories, to select one or more constraint values for the facet using the one or more manipulator fields;
  program instructions, stored on at least one of the one or more computer-readable, tangible storage devices for execution by at least one of the one or more processors via at least one of the one or more memories, to search, by the one or more facets, the one or more databases;
  program instructions, stored on at least one of the one or more computer-readable, tangible storage devices for execution by at least one of the one or more processors via at least one of the one or more memories, to calculate, responsive to searching the one or more databases by the one or more facets, one or more interim search results for each selected constraint value, wherein the interim search results comprise at least one of product counts for recently modified facets or facet constraints, a portion of searched items that meet a constraint of a previewed facet, a brand, a product feature, and a hyperlink to another search result or web page;
  program instructions, stored on at least one of the one or more computer-readable, tangible storage devices for execution by at least one of the one or more processors via at least one of the one or more memories, to present, responsive to a cursor moving over an active region of the one or more manipulator fields for the facet, a preview of the interim search results, wherein the preview includes one or more of: details of one or more database items satisfying one or more selected constraint values for the facet, or a numerical value indicating a number of items in the facet satisfying the one or more selected constraints; and
  program instructions, stored on at least one of the one or more computer-readable, tangible storage devices for execution by at least one of the one or more processors via at least one of the one or more memories, to display in the view field a list of items retrieved from the one or more databases that meet the one or more constraint values in the one or more manipulator fields, and wherein the view field automatically updates in response to a change in any of the one or more manipulator fields.

9. The system of claim 8 further comprising:
  program instructions, stored on at least one of the one or more computer-readable, tangible storage devices for execution by at least one of the one or more processors via at least one of the one or more memories, to display a graphical representation of the one or more constraints for the one or more continuous facets.

10. The system of claim 9 wherein the program instructions to select the one or more constraint values for the facet using the one or more manipulator fields select a point on a slider bar to set a range, wherein the range is defined by a minimum range and a maximum range.

* * * * *